United States Patent
Haramai et al.

(10) Patent No.: US 7,836,350 B2
(45) Date of Patent: Nov. 16, 2010

(54) METHOD OF MANAGING PATHS FOR AN EXTERNALLY-CONNECTED STORAGE SYSTEM AND METHOD OF DETECTING A FAULT SITE

(75) Inventors: Naoki Haramai, Yokohama (JP); Hiroshi Yokouchi, Yokohama (JP); Ryu Gemba, Yokohama (JP); Atsushi Kondo, Yokohama (JP); Kazuhiro Oyama, Ebina (JP)

(73) Assignee: Hitachi, Ltd., Tokyo (JP)

( * ) Notice: Subject to any disclaimer, the term of this patent is extended or adjusted under 35 U.S.C. 154(b) by 351 days.

(21) Appl. No.: 12/213,687

(22) Filed: Jun. 23, 2008

(65) Prior Publication Data

US 2009/0265577 A1 Oct. 22, 2009

(30) Foreign Application Priority Data

Apr. 17, 2008 (JP) .............................. 2008-107852

(51) Int. Cl.
*G06F 11/00* (2006.01)

(52) U.S. Cl. ..................................... 714/43; 709/239
(58) Field of Classification Search ................ None
See application file for complete search history.

(56) References Cited

U.S. PATENT DOCUMENTS

| | | | |
|---|---|---|---|
| 6,996,741 B1* | 2/2006 | Pittelkow et al. .............. 714/5 |
| 7,181,578 B1* | 2/2007 | Guha et al. ................. 711/154 |
| 7,236,987 B1* | 6/2007 | Faulkner et al. .................... 1/1 |
| 7,290,168 B1* | 10/2007 | DeKoning ..................... 714/9 |
| 7,603,507 B2 | 10/2009 | Yagi et al. |
| 7,716,419 B2* | 5/2010 | Kashima et al. ............. 711/114 |
| 2006/0047906 A1 | 3/2006 | Umemura |
| 2009/0113234 A1* | 4/2009 | Kurasawa et al. .............. 714/4 |

FOREIGN PATENT DOCUMENTS

| | | |
|---|---|---|
| JP | 06-048033 | 6/1994 |
| JP | 2006-178811 | 7/2006 |
| JP | 2007-257667 | 6/2007 |

OTHER PUBLICATIONS

Scadden et al., "Resilient hosting in a continuously available virtualized environment", 2008 IBM Systems Journal, vol. 47, No. 4.*
Office Action from Japanese Patent Office for Japanese Patent Application 2008-107852 mailed May 18, 2010.

* cited by examiner

*Primary Examiner*—Gabriel L Chu
(74) *Attorney, Agent, or Firm*—Stites & Harbison, PLLC; Juan Carlos A. Marquez, Esq.

(57) ABSTRACT

Provided is a method of controlling a computer system that includes: a computer; a first storage device connected to the computer via a first path and a second path; and a second storage device externally-connected to the first storage system via a third path and connected to the computer via a fourth path, the first storage device providing a first storage area to the computer, the second storage device including a second storage area corresponding to the first storage area, the method including: judging whether or not a fault has occurred in at least one of the first to fourth paths; selecting, a path used for access to the first or second storage area; and transmitting the access request for the first or second storage area by using the selected path. Accordingly, in the computer system, an application can be prevented from being stopped despite a fault in a path.

16 Claims, 12 Drawing Sheets

FIG. 3

PATH MANAGEMENT TABLE (109)

| PathID | HBA | CONNECTION SOURCE STORAGE SYSTEM | | | | | EXTERNALLY-CONNECTED STORAGE SYSTEM | | CABLE INFORMATION | STATUS |
|---|---|---|---|---|---|---|---|---|---|---|
| | | FIRST NETWORK PA | | CHA INFORMATION | | VOL INFORMATION | SECOND NETWORK PB | | | |
| | | | | | | | CHA INFORMATION | VOL INFORMATION | | |
| 0001 | HBA1 | PortA1 | PortA3 | CHA1-1 | CHA1-4 | V-VOL | — | — | CHA2-1 | R-VOL | FC | OFFLINE |
| 0002 | HBA2 | PortA2 | PortA4 | CHA1-2 | CHA1-5 | V-VOL | — | — | CHA2-2 | R-VOL | FC | OFFLINE |
| 0003 | NIC2 | — | — | CHA1-3 | — | V-VOL | PortB1 | PortB3 | — | R-VOL | iSCSI | ONLINE |
| 0004 | NIC1 | — | — | — | — | — | PortB2 | PortB4 | CHA2-3 | R-VOL | iSCSI | ONLINE |
| 301 | 302 | 303 | | 304 | | 305 | 306 | | 307 | 308 | 309 | 310 |

STATUS MANAGEMENT TABLE 110

| ID | COMPONENT | STATUS |
|---|---|---|
| 01 | HBA | ONLINE |
| 02 | NETWORK | ONLINE |
| 03 | STORAGE | OFFLINE |

HBA STATUS TABLE 111

| ID | HBA | STATUS |
|---|---|---|
| 01 | HBA1 | ONLINE |
| 02 | HBA2 | ONLINE |

| FAULT SITE | | ACCESS ROUTE | |
|---|---|---|---|
| - | | PA to V-VOL to PB to R-VOL | 1211 |
| PA | PA1 | PA2 to V-VOL to PB to R-VOL | 1212 |
| | PA2 | PA1 to V-VOL to PB to R-VOL | 1213 |
| | PA | PC to V-VOL to PB to R-VOL | 1214 |
| PB | PB1 | PA to V-VOL to PB2/PD to R-VOL | 1215 |
| | PB2 | PA to V-VOL to PB1/PD to R-VOL | 1216 |
| | PB | PD to R-VOL | 1217 |
| PA/PB | PA1/PB1 | PA2 to V-VOL to PB2/PD to R-VOL | 1218 |
| | PA1/PB2 | PA2 to V-VOL to PB1/PD to R-VOL | 1219 |
| | PA2/PB1 | PA1 to V-VOL to PB2/PD to R-VOL | 1220 |
| | PA2/PB2 | PA1 to V-VOL to PB1/PD to R-VOL | 1221 |
| | PA/PB1 | PC to V-VOL to PB2/PD to R-VOL | 1222 |
| | PA/PB2 | PC to V-VOL to PB1/PD to R-VOL | 1223 |
| | PA1/PB | PD to R-VOL | 1224 |
| | PA2/PB | PD to R-VOL | 1225 |
| | PA/PB | PD to R-VOL | 1226 |

*FIG. 12*

METHOD OF MANAGING PATHS FOR AN EXTERNALLY-CONNECTED STORAGE SYSTEM AND METHOD OF DETECTING A FAULT SITE

CLAIM OF PRIORITY

The present application claims priority from Japanese application JP2008-107852 filed on Apr. 17, 2008, the content of which is hereby incorporated by reference into this application.

BACKGROUND

This invention relates to a technology of managing data paths in a storage system, in particular, detecting a fault site in an externally-connected storage system upon occurrence of a fault and switching paths therein.

For example, JP 2007-257667 A discloses a technology of so-called storage system external-connection, in which a first storage system connected to a computer is further connected to a second storage system and provides the computer with a physical storage area of the second storage system as a virtual storage area of the first storage system. According to such external-connection, a function included in the first storage system can also be applied to the storage area of the second storage system.

SUMMARY

In an environment in which a storage system is externally connected as described above, when a fault (for example, a breakage) occurs in every data path between the computer and the first storage system to disconnect communication, even if paths between the first storage system and the second storage system are in a normal state, the computer becomes unable to access the storage area of the second storage system. Even if the paths between the computer and the first storage system are in a normal state, when communication performed through every path between the first storage system and the second storage system is disconnected, the computer similarly becomes unable to access the storage area of the second storage system. In either of the above-mentioned cases, conventional path management software running on the computer recognizes that a fault occurs in every path between the computer and the first storage system. As a result, in either of the above-mentioned cases, an application that uses the storage area of the second storage system is brought to a halt.

According to a representative invention disclosed in this application, there is provided a method of controlling a computer system, the computer system including: a computer; a first storage system; and a second storage system, the first storage system being connected to the computer via a first path and a second path, the second storage system being connected to the first storage system via a third path and connected to the computer via a fourth path, the computer including: a first interface connected to the first path; a second interface connected to the second path; a third interface connected to the fourth path; a first processor connected to the first interface, the second interface, and the third interface; and a first memory connected to the first processor, the first storage system including a first controller connected to the first path, the second path, and the third path, the first storage system providing a first storage area to the computer, the second storage system including a second controller connected to the third path and the fourth path, and a second storage area, the first storage system being configured to convert, upon reception of an access request for access to the first storage area from the computer, the received access request into an access request for access to the second storage area, and transmit the converted access request to the second storage system via the third path, the second storage system being configured to execute, upon reception of the access request for the access to the second storage area from one of the computer and the first storage system, an access processing for the access to the second storage area based on the received access request, the computer holding: a first information item in which the first storage area is associated with the second storage area; and a second information item in which a judgment result as to whether or not a fault has occurred in at least one of the first path, the second path, the third path, and the fourth path is associated with at least one of the first path, the second path, the third path, and the fourth path used for one of the access to the first storage area and the access to the second storage area, the method comprising: a first step of judging, by the computer, whether or not a fault has occurred in at least one of the first path, the second path, the third path, and the fourth path; a second step of selecting, by the computer, based on the judgment result and the second information item, at least one of the first path, the second path, the third path, and the fourth path used for one of the access to the first storage area and the access to the second storage area; and a third step of transmitting, by the computer, the access request for one of the access to the first storage area and the access to the second storage area by using the selected at least one of the first path, the second path, the third path, and the fourth path.

According to an embodiment of this invention, if a fault occurs in any one of the paths within a range from the computer to the second storage system, an auxiliary path can be used to continue the application.

BRIEF DESCRIPTION OF THE DRAWINGS

FIG. 3 is an explanatory diagram of a path management table according to the embodiment of this invention.

FIG. 5 is an explanatory diagram of a status management table according to the embodiment of this invention.

FIG. 6 is an explanatory diagram of an HBA status table according to the embodiment of this invention.

FIG. 12 is an explanatory diagram of an access route judgment table according to the embodiment of this invention.

DETAILED DESCRIPTION OF THE PREFERRED EMBODIMENTS

Hereinafter, an embodiment of this invention will be described by referring to the figures.

Figure 1:
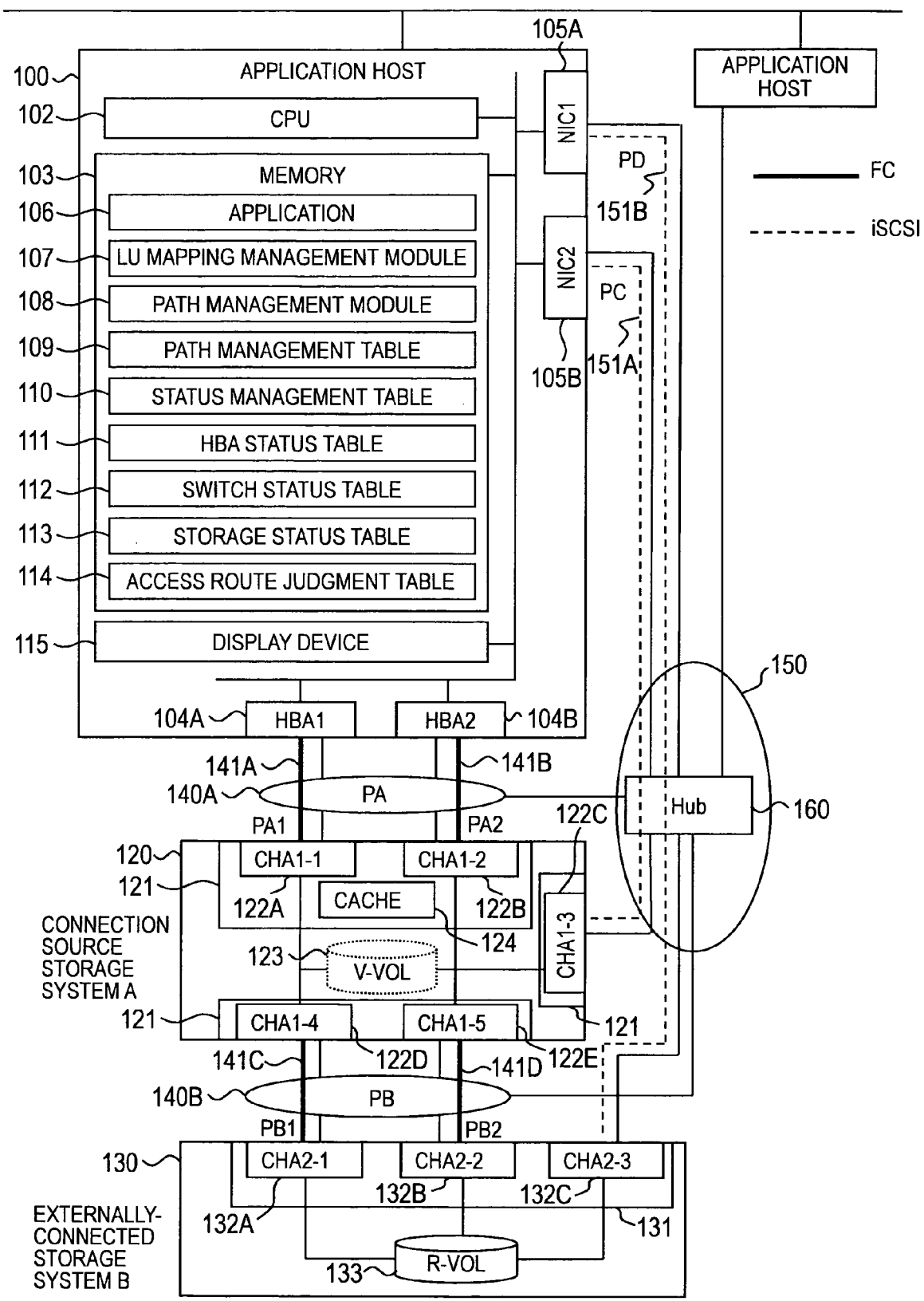
FIG. 1 is a block diagram showing a configuration of a computer system according to an embodiment of this invention.

FIG. 1 is a block diagram showing a configuration of a computer system according to the embodiment of this invention.

The computer system according to the embodiment of this invention includes an application host 100, a connection source storage system A 120, and an externally-connected storage system B 130.

The application host 100 represents a computer that uses a storage area of the externally-connected storage system B 130 to execute various applications. The application host 100 includes a CPU 102, a memory 103, a plurality of host bus adapters (HBAs) 104, and a plurality of network interface cards (NICs) 105, which are interconnected. Each of HBA1 104A and HBA2 104B shown in FIG. 1 is one of the plurality of HBAs 104. Each of NIC1 105A and NIC2 105B is one of the plurality of NICs 105.

The CPU 102 represents a processor for executing programs stored in the memory 103. In the following description, a processing executed by the program stored in the memory 103 is actually executed by the CPU 102.

The memory 103 represents a storage device for storing a program executed by the CPU 102 and data and the like to be referenced by the CPU 102. Stored in the memory 103 of this embodiment are an application 106, an LU mapping management module 107, a path management module 108, a path management table 109, a status management table 110, an HBA status table 111, a switch status table 112, a storage status table 113, and an access route judgment table 114.

The application 106 represents a program for implementing various applications provided by the application host 100. The application 106 uses the storage area of the externally-connected storage system B 130 as necessary.

The LU mapping management module 107 includes a program and table for managing a correlation between a virtual storage area provided to the application host 100 by the connection source storage system A 120 and a physical storage area provided to the externally-connected storage system B 130.

The path management module 108 includes a program for managing data transfer routes among the application host 100, the connection source storage system A 120, and the externally-connected storage system B 130.

The above-mentioned programs and tables will be described later in detail.

The application host 100 is connected to the connection source storage system A 120 via a first network 140A. The connection source storage system A 120 is connected to the externally-connected storage system B 130 via a second network 140B. In the following description, the first network 140A will be referred to also as "PA" (Path A), and the second network 140B will be referred to also as "PB" (Path B).

Figure 4:
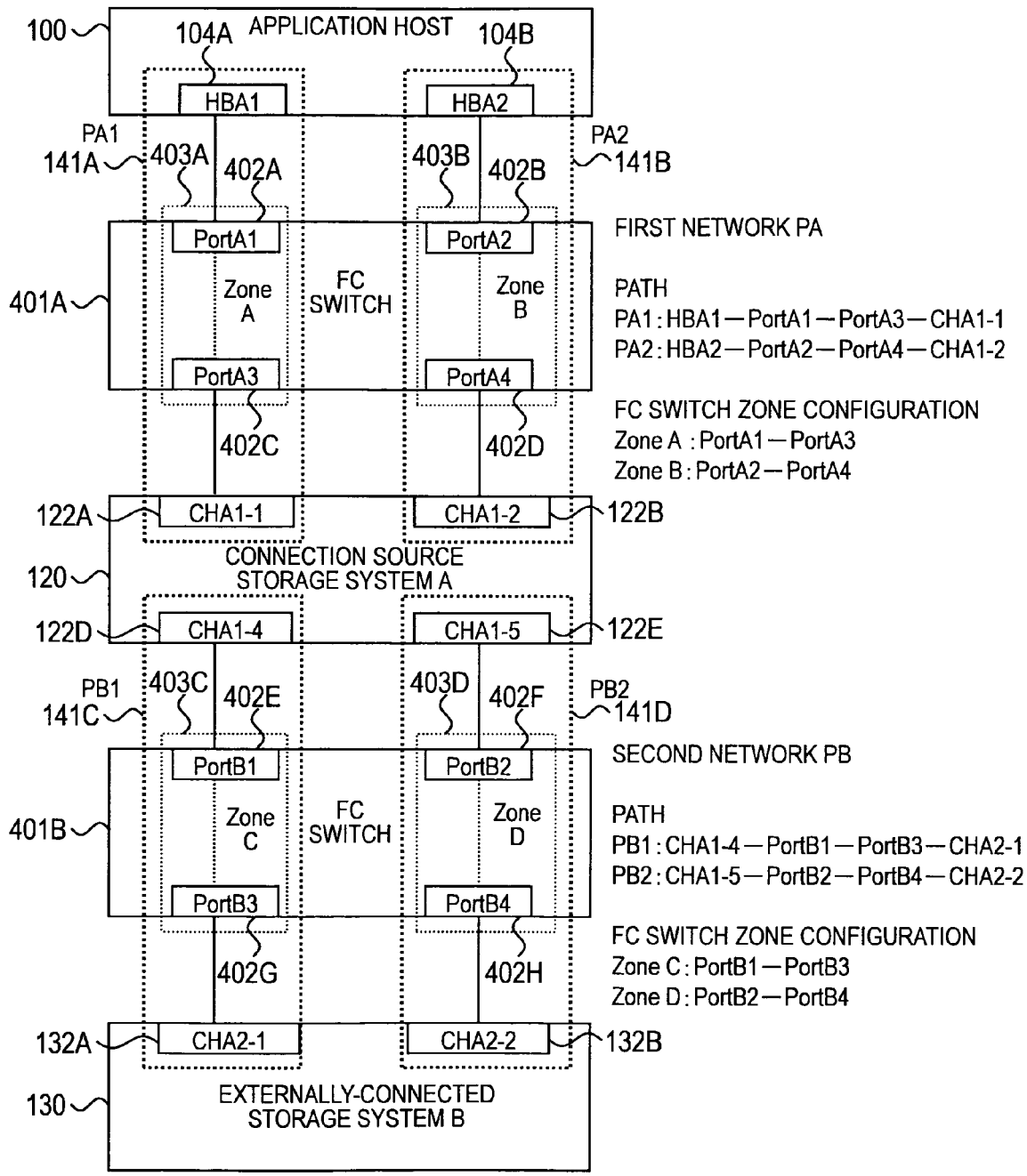
FIG. 4 is a detailed explanatory diagram of paths set according to the embodiment of this invention.

In this embodiment, PA 140A and PB 140B are a so-called storage area network (SAN) to which a Fibre channel (FC) protocol is applied. As shown in FIG. 4, each of PA 140A and PB 140B may include at least one FC switch. In the following description, PA 140A and PB 140B will also be referred to generically as "FC network".

HBA1 104A and HBA2 104B are interfaces connected to PA 140A. In a case where the FC protocol is applied to PA 140A, HBA1 104A and HBA2 104B are FC cards high in communication speed. The application host 100 can access the virtual storage area of the connection source storage system A 120 via PA 140A.

As described later by referring to FIG. 4, PA 140A may include a plurality of paths that connect the application host 100 and the connection source storage system A 120. In the example of FIG. 1, PA 140A contains two paths, PA1 141A and PA2 141B. In this example, HBA1 104A and HBA2 104B are connected to PA1 141A and PA2 141B, respectively.

In the same manner, PB 140B may include a plurality of paths that connect the connection source storage system A 120 and the externally-connected storage system B 130. In the example of FIG. 1, PB 140B contains two paths, PB1 141C and PB2 141D.

In addition, the application host 100, the connection source storage system A 120, the externally-connected storage system B 130, and the respective FC switches are connected to one another via a third network 150. The third network 150 is, for example, an internet protocol (IP) network. The third network 150 may include at least one hub 160.

NIC1 105A and NIC2 105B are interfaces connected to the third network 150. In a case where the third network 150 is the IP network, NIC1 105A and NIC2 105B are network interface cards lower in communication speed than the FC cards.

The application host 100 of this embodiment can also access the physical storage area provided to the externally-connected storage system B 130 via the third network 150. For example, Path C (PC) 151A that extends from NIC2 105B via the hub 160 to the connection source storage system A 120 and Path D (PD) 151B that extends from NIC1 105A via the hub 160 to the externally-connected storage system B 130 may be set in the third network 150. By applying, for example, an iSCSI protocol to PC 151A or PD 151B, the application host 100 may access the storage area of the externally-connected storage system B 130.

It should be noted that the types of the first network 140A, the second network 140B, and the third network 150 are not limited to the above-mentioned settings. However, it is desirable that the first network 140A and the second network 140B be a network capable of transferring a large volume of data at high speed. On the other hand, the third network 150 may be lower in speed than the first network 140A and the second network 140B, but desirably be a network low in cost and high in general versatility.

The connection source storage system A 120 includes a controller 121. The controller 121 includes a plurality of channel adapters (CHA) 122. Each of the CHAs 122 is an interface for communicating with the application host 100 or the externally-connected storage system B 130 through the FC protocol or iSCSI protocol. Each of CHA1-1 122A, CHA1-2 122B, CHA1-3 122C, CHA1-4 122D, and CHA1-5 122E shown in FIG. 1 is one of the plurality of CHAs 122.

Each of the CHAs 122 includes a CPU (not shown), a memory (not shown), and at least one port (not shown). Each port is connected to the first network 140A, the second network 140B, or the third network 150. Each port is assigned a network address, for example, World Wide Name (WWN) or IP address, for identifying the port in a network to which the port is connected.

In the example of FIG. 1, CHA1-1 122A and CHA1-2 122B are connected to PA1 141A and PA2 141B, respectively. CHA1-3 122C is connected to the hub 160. CHA1-4 122D and CHA1-5 122E are connected to PB1 141C and PB2 141D, respectively.

Figure 2:
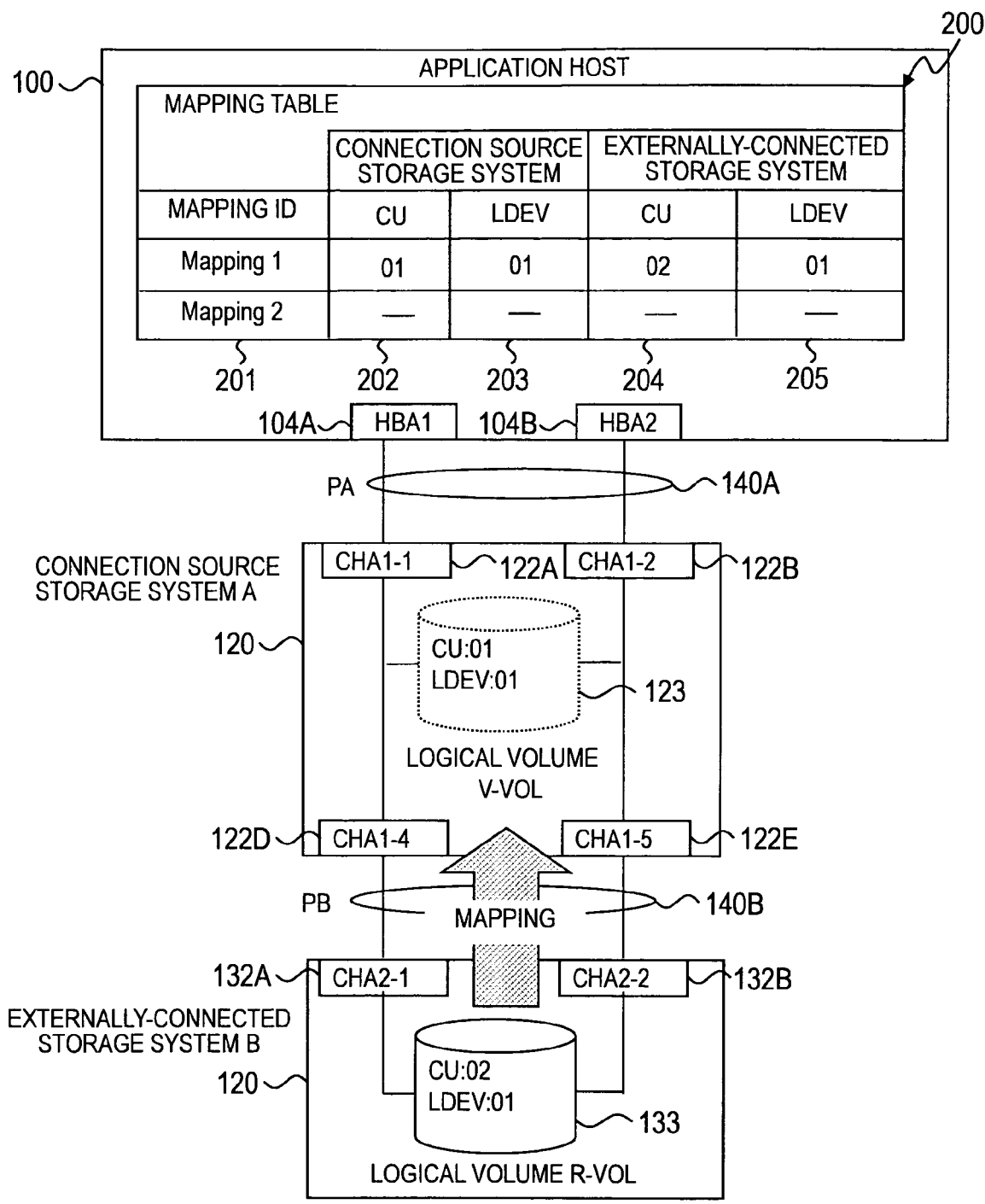
FIG. 2 is an explanatory diagram of assignment of storage areas performed by an LU mapping management module according to the embodiment of this invention

The controller 121 provides the application host 100 with V-VOL 123, which is a virtual storage area (virtual logical volume). As shown in FIG. 2, V-VOL 123 is associated with R-VOL 133, which is a physical storage area (real logical volume), within the externally-connected storage system B 130.

The connection source storage system A 120 may further include a storage device (not shown) such as a hard disk drive (HDD) for providing a physical storage area. In that case, in order to provide the physical storage area to the application host 100, the controller 121 controls access (in other words, data write and read) from the application host 100 to the physical storage area.

The externally-connected storage system B 130 includes a controller 131 and a physical storage area (R-VOL) 133.

The controller 131 includes a plurality of CHAs 132. Each of the CHAs 132 is an interface for communicating with the application host 100 or the connection source storage system A 120 through the FC protocol or iSCSI protocol. Each of CHA2-1 132A, CHA2-2 132B, and CHA2-3 132C shown in FIG. 1 is one of the plurality of CHAs 132. Each of the CHAs 132 includes a CPU, a memory, and a port in the same manner as the CHA 122.

In the example of FIG. 1, CHA2-1 132A and CHA2-2 132B are connected to PB1 141C and PB2 141D, respectively. CHA2-3 132C is connected to the hub 160.

R-VOL 133 may be implemented by one or a plurality of storage devices. The storage device or the storage devices that implement R-VOL 133 may be, for example, an HDD or a semiconductor memory device such as a flash memory.

The controller 131 provides R-VOL 133 to at least one of the application host 100 and the connection source storage system A 120. To be specific, when an access request to R-VOL 133 is received from the application host 100 or the connection source storage system A 120, the controller 131 executes the requested access, and transmits the result to a request source.

Herein, description will be made of the access from the application host 100 to R-VOL 133 in a case where each network is operating in an normal state.

The application host 100 executes the application 106, and transmits the access request for V-VOL 123 via PA 140A as necessary. If PA 140A includes a plurality of paths (for example, PA1 141A and PA2 141B), the application host 100 may transmit a plurality of access requests distributively to their corresponding plurality of paths so as to balance the access load.

Upon reception of the access request, the controller 121 of the connection source storage system A 120 identifies the physical storage area within the externally-connected storage system B 130 (in the example of FIG. 1, R-VOL 133) that corresponds to V-VOL 123 specified as an access destination. For this identification, the controller 121 previously holds information in which the virtual storage area within the connection source storage system A 120 is associated with the physical storage area within the externally-connected storage system B 130.

The controller 121 converts the received access request into an access request for R-VOL 133 that has been identified, and transmits the converted request to the externally-connected storage system B 130. To be specific, based on the received access request, the controller 121 generates an access request for R-VOL 133 that has been identified, and transmits the generated access request via PB 140B.

If PB 140B includes a plurality of paths (for example, PB1 141C and PB2 141D), the controller 121 may transmit the generated plurality of access requests distributively to their corresponding plurality of paths so as to balance the access load.

Upon reception of the access request, the controller 131 of the externally-connected storage system B 130 executes the access to R-VOL 133 based on the received access request, and transmits the result to a transmission source of the access request (in other words, the connection source storage system A 120). The controller 121 of the connection source storage system A 120 transmits the received result to the application host 100.

According to the above-mentioned procedure, for example, if the application host 100 transmits a write request to write data to V-VOL 123, the requested data is transferred to the externally-connected storage system B 130 via the connection source storage system A 120, and is stored in R-VOL 133. If the application host 100 transmits a read request to read data from V-VOL 123, the requested data is read from R-VOL 133, and is transferred to the application host 100 via the connection source storage system A 120.

Such a mode of storage system connection and access as described above is called "storage system external-connection".

It should be noted that the controller 121 of the connection source storage system A 120 may further include a cache memory 124. Temporarily stored in the cache memory 124 is at least one of the data written to V-VOL 123 and the data read from V-VOL 123. By using the cache memory 124, a period of time required for access to V-VOL 123 (in other words, in actuality, a period of time required for access to R-VOL 133) is concealed from the viewpoint of the application host 100.

Next, description will be made of a case where a fault occurs in the network.

For example, even when communication performed through one of PA1 141A and PA2 141B included in PA 140A is disconnected due to a fault, if the other is in a normal state, the application host 100 can access V-VOL 123. However, when communication performed through every path included in PA 140A is disconnected, the application host 100 becomes unable to access V-VOL 123 via PA 140A. In the same manner, when communication performed through every path included in PB 140B is disconnected, the connection source storage system A 120 becomes unable to access R-VOL 133 via PB 140B.

In the conventional external-connection, when communication performed through every path in at least one of PA 140A and PB 140B is disconnected, even if the other is in a normal state, the application host 100 becomes unable to access R-VOL 133. This brings the application using the data stored in R-VOL 133 to a halt. Further, no matter which of PA 140A and PB 140B a fault may occur in, the application host 100 recognizes that the fault has occurred in PA 140A, which makes it impossible to identify the path in which the fault has actually occurred.

In this embodiment, the application host 100 can execute access to V-VOL 123 and R-VOL 133 via the third network 150 through the iSCSI protocol. Accordingly, if a fault occurs in at least one of PA 140A and PB 140B, the application host 100 can continue the application by using the third network as an auxiliary path. If the third network 150 is a network lower in speed than PA 140A and PB 140B, the use of the third network 150 instead of PA 140A or PB 140B lowers performance of the application, but prevents the application from being brought to a complete halt.

In addition, the application host 100 of this embodiment can identify a site where the fault has occurred and notify an administrator to that effect.

In order to realize the above embodiment, programs and tables as shown in FIG. 1 are stored in the memory 103 of the application host 100. Description thereof will be made hereinbelow.

FIG. 2 is an explanatory diagram of assignment of the storage areas performed by the LU mapping management module 107 according to the embodiment of this invention The LU mapping management module 107 includes a mapping table 200. The mapping table 200 contains information for managing the assignment (in other words, mapping) of the real logical volume within the externally-connected storage system B 130 to the virtual logical volume within the connection source storage system A 120.

To be specific, the mapping table 200 contains a mapping ID 201, a CU 202 of the connection source storage system, an LDEV 203 of the connection source storage system, a CU 204 of the externally-connected storage system, and an LDEV 205 of the externally-connected storage system.

The mapping ID 201 is an identifier of mapping of the real volume with respect to the virtual logical volume. The mapping of one real volume with respect to one virtual logical volume is identified by one mapping ID 201.

The CU 202 of the connection source storage system and the LDEV 203 of the connection source storage system are information for identifying the virtual logical volume. To be specific, the CU 202 of the connection source storage system is an identifier of a controller for managing the virtual logical volume (in other words, controlling access to the virtual logical volume). The LDEV 203 of the connection source storage system is an identifier given to the virtual logical volume by the controller.

The CU 204 of the externally-connected storage system and the LDEV 205 of the externally-connected storage system are information for identifying the real logical volume. To be specific, the CU 204 of the externally-connected storage system is an identifier of a controller for managing the real logical volume. The LDEV 205 of the externally-connected storage system is an identifier given to the real logical volume by the controller.

The identifier given to the logical volume by the controller is not unique within the storage system, but is unique within a control range of the same controller. Therefore, by combining the identifier of the controller and the identifier of the logical volume, it is possible to identify the logical volume uniquely within the storage system.

For example, if R-VOL 133 is mapped to V-VOL 123 (in other words, the data written to V-VOL 123 is actually stored in R-VOL 133) with the identifier of V-VOL 123 set to "01", the identifier of the controller 121 for controlling access to V-VOL 123 set to "01", the identifier of R-VOL 133 set to "01", and the identifier of the controller 131 for controlling access to R-VOL 133 set to "02", as shown in FIG. 2, the values held as the CU 202 of the connection source storage system, the LDEV 203 of the connection source storage system, the CU 204 of the externally-connected storage system, and the LDEV 205 of the externally-connected storage system, which correspond to one mapping ID 201 (for example, "Mapping1"), are "01", "01", "02", and "01", respectively.

FIG. 3 is an explanatory diagram of the path management table 109 according to the embodiment of this invention.

The path management table 109 holds information for managing a path that extends from the application host 100 for transmitting an access request to the real logical volume in which the data whose access has been requested is stored.

To be specific, the path management table 109 contains a path ID 301, an HBA 302, a first network PA 303, CHA information 304 of the connection source storage system, volume information 305 of the connection source storage system, a second network PB 306, CHA information 307 of the externally-connected storage system, volume information 308 of the externally-connected storage system, cable information 309, and a status 310.

The path ID 301 is an identifier of a path that extends from the application host 100 to the real logical volume.

The HBA 302 is an identifier of the HBA 104 involved in the path.

The first network PA 303 is an identifier of a port of the FC switch within PA 140A, as shown in FIG. 4, involved in the path.

The CHA information 304 of the connection source storage system is an identifier of the CHA 122 involved in the path.

The volume information 305 of the connection source storage system is an identifier of the virtual logical volume accessed via the path (in other words, the virtual logical volume specified as an access destination by the application host 100). It should be noted that in the example of FIG. 3, the value "V-VOL" is held as the volume information 305 of the connection source storage system, but as in FIG. 2, information such as the value "CU:01, LDEV:01" may be held.

The second network PB 306 is an identifier of a port of the FC switch within PB 140B, as shown in FIG. 4, involved in the path.

The CHA information 307 of the externally-connected storage system is an identifier of the CHA 132 involved in the path.

The volume information 308 of the externally-connected storage system is an identifier of the real logical volume accessed via the path (in other words, the real logical volume mapped to the virtual logical volume specified as an access destination by the application host 100). It should be noted that in the example of FIG. 3, the value "R-VOL" is held as the volume information 308 of the externally-connected storage system, but as in FIG. 2, information such as the value "CU:02, LDEV:01" may be held.

The cable information 309 is information for identifying a cable used for connecting the respective components involved in the path. Information for identifying the protocol applied to the path may be held as the cable information 309.

The status 310 is information for identifying a status of the path, to be specific, information indicating whether the path is in a normal state (in other words, an "ONLINE" status) or in a state where communication cannot be performed due to a fault (in other words, an "OFFLINE" status).

Upon detection of the fault that has occurred in the path, the path management module 108 executes a processing of updating the status of each section, and updates the status 310 according to the result. The processing of updating the status will be described later by referring to FIG. 11.

FIG. 4 is a detailed explanatory diagram of the paths set according to the embodiment of this invention.

To be specific, FIG. 4 is the diagram for explaining in detail the path to which the FC protocol is applied among the paths set in the system shown in FIG. 1. It should be noted that among the components shown from FIG. 1, those unnecessary for the description of the path are omitted in FIG. 4.

FIG. 4 shows FC switches 401A and 401B omitted from FIG. 1. The FC switch 401A includes PortA1 402A, PortA2 402B, PortA3 402C, and PortA4 402D. PortA1 402A is connected to HBA1 104A. PortA2 402B is connected to HBA2 104B. PortA3 402C is connected to CHA1-1 122A. PortA4 402D is connected to CHA1-2 122B.

In the example of FIG. 4, there are set ZoneA 403A including PortA1 402A and PortA3 402C and ZoneB 403B including PortA2 402B and PortA4 402D. In this case, the FC switch 401A can output, for example, the data inputted from PortA1 402A, from PortA3 402C, but cannot output the data from either of PortA2 402B or PortA4 402D.

In FIG. 4, the path that extends from HBA1 104A via PortA1 402A and PortA3 402C to reach CHA1-1 122A corresponds to PA1 141A shown in FIG. 1. The path that extends from HBA2 104B via PortA2 402B and PortA4 402D to reach CHA1-2 122B corresponds to PA2 141B shown in FIG. 1.

The FC switch 401B includes PortB1 402E, PortB2 402F, PortB3 402G, and PortB4 402H. PortB1 402E is connected to CHA1-4 122D. PortB2 402F is connected to CHA1-5 122E. PortB3 402G is connected to CHA2-1 132A. PortB4 402H is connected to CHA2-2 132B.

In the example of FIG. 4, there are set ZoneC 403C including PortB1 402E and PortB3 402G and ZoneD 403D including PortB2 402F and PortB4 402H. The path that extends from CHA1-4 122D via PortB1 402E and PortB3 402G to reach CHA2-1 132A corresponds to PB1 141C shown in FIG. 1. The path that extends from CHA1-5 122E via PortB2 402F and PortB4 402H to reach CHA2-2 132B corresponds to PB2 141D shown in FIG. 1.

With the paths set as shown in FIG. 1 and FIG. 4, the path management table 109 is obtained as shown in, for example, FIG. 3.

The path identified by the path ID "0001" is a path that extends from HBA1 104A to reach R-VOL 133. The path identified by the path ID "0002" is a path that extends from HBA2 104B to reach R-VOL 133. Since the FC protocol is applied to those paths, the value "FC" is held as the cable information 309 corresponding thereto.

Further contained in the path management table 109 is information on the paths that extend via the third network 150.

The path identified by the path ID "0003" is a path that extends from NIC2 105B via V-VOL 123 to reach R-VOL 133. The path identified by the path ID "0004" is a path that extends from NIC1 105A to reach R-VOL 133 bypassing the connection source storage system A 120. Since the iSCSI protocol is applied to those paths, the value "iSCSI" is held as the cable information 309 corresponding thereto.

In the example of FIG. 3, the value "OFFLINE" is held as the status 310 corresponding to the path IDs "0001" and "0002", and the value "ONLINE" is held as the status 310 corresponding to the path IDs "0003" and "0004". This indicates a state where the two paths identified by the path IDs "0001" and "0002" cannot perform communication due to a fault that has occurred in any site involved in each of the paths.

The application host 100 may output the path management table 109 shown in FIG. 3. For example, the application host 100 may display the path management table 109 on a display device 115. If any one of the paths is in an "OFFLINE" status, the user may input an instruction to display a detailed state of the path in order to identify the site where the fault has occurred. When this instruction is inputted, the contents of the status management table 110 are newly outputted.

FIG. 5 is an explanatory diagram of the status management table 110 according to the embodiment of this invention.

The status management table 110 holds information that indicates states of components that form a path. To be specific, the status management table 110 contains an ID 501, a component 502, and a status 503.

The ID 501 is a numeral given to each entry within the status management table 110.

The component 502 is a category name of a path component. In the example of FIG. 5, the values "HBA", "network", and "storage" are held as the component 502.

The status 503 is information that indicates a state of the path component on a category basis. For example, if all of the HBAs 104 (in the example of FIG. 1, HBA1 104A and HBA2 104B) within the application host 100 are in a normal state, the value "ONLINE" is held as the status 503 corresponding to "HBA". On the other hand, if a fault occurs in at least one of the HBAs 104 within the application host 100, the value "OFFLINE" is held as the status 503 corresponding to the value "HBA".

In a similar manner, if a fault occurs in at least one of the networks via which the data requested by the application host 100 is accessed (in the example of FIG. 1, the first network (PB) 140A and the second network (PB) 140B), the value "OFFLINE" is held as the status 503 corresponding to the value "network". If a fault occurs in at least one of the storage systems that process the access request from the application host 100 (in the example of FIG. 1, the connection source storage system A 120 and the externally-connected storage system B 130), the value "OFFLINE" is held as the status 503 corresponding to the value "storage".

The status 503 has the value set based on the contents of the HBA status table 111, the switch status table 112, and the storage status table 113 which will be described later. In the example of FIG. 5, the value "OFFLINE" is held as the status 503 corresponding to the value "storage".

If any one of the component categories is in an "OFFLINE" status, the user may input an instruction to display a detailed state of the component category in order to identify the site where the fault has occurred. When this instruction is inputted, the contents of at least one of the HBA status table 111, the switch status table 112, and the storage status table 113 are newly outputted according to the instruction.

FIG. 6 is an explanatory diagram of the HBA status table 111 according to the embodiment of this invention.

The HBA status table 111 holds information that indicates a state of each of the HBAs 104 included in the application host 100. To be specific, the HBA status table 111 contains an ID 601, an HBA 602, and a status 603.

The ID 601 is a numeral given to each entry within the HBA status table 111.

The HBA 602 is an identifier of each of the HBAs 104 included in the application host 100.

The status 603 is information that indicates a state of each of the HBAs 104. The value "ONLINE" indicates that the HBA 104 is operating normally, and the value "OFFLINE" indicates that a fault has occurred in the HBA 104.

In the example of FIG. 6, both HBA1 104A and HBA2 104B included in the application host 100 are operating normally. This corresponds to the indication that the status 503 corresponding to "HBA" is set to "ONLINE" in FIG. 5. In a case where the status 603 corresponding to at least one of HBA1 104A and HBA2 104B is set to "OFFLINE", the status 503 corresponding to "HBA" is set to "OFFLINE" in FIG. 5.

Figure 7:
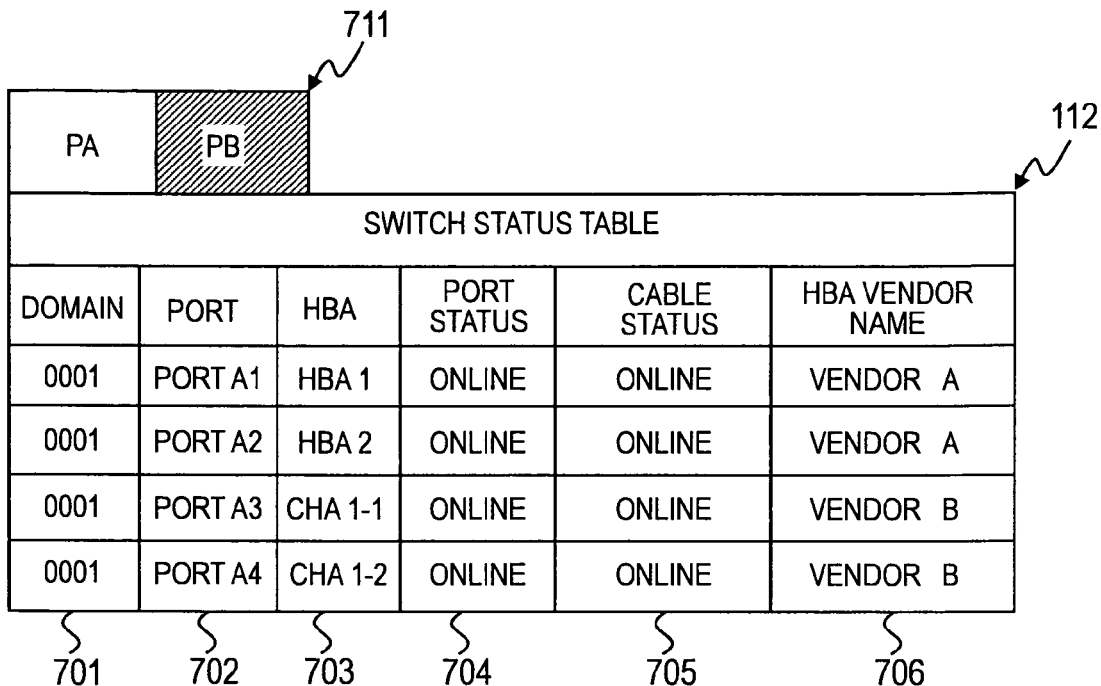
FIG. 7 is an explanatory diagram of a switch status table according to the embodiment of this invention.

FIG. 7 is an explanatory diagram of the switch status table 112 according to the embodiment of this invention.

FIG. 7 shows the contents of the switch status table 112 displayed on the display device 115 according to the instruction from the user.

The displayed switch status table 112 holds information that indicates a state of each of the components of the networks via which the data requested by the application host 100 is accessed. To be specific, the switch status table 112 contains a domain 701, a port 702, an HBA 703, a port status 704, a cable status 705, an HBA vendor name 706, and a selection tab 711.

The selection tab 711 is a tab that is specified to select the network to be displayed. In this embodiment, as shown in FIG. 1, the data is accessed via the two networks, PA 140A and PB 140B. Therefore, in the example of FIG. 7, the selection tab 711 corresponding to each of PA 140A and PB 140B is displayed. FIG. 7 shows a case where PA 140A is selected. In this case, as shown in FIG. 7, the display device 115 displays information that indicates the states of the components that form PA 140A.

It should be noted that in addition to the information indicating the states of the components that form PA 140A shown in FIG. 7, the switch status table 112 stored in the memory 103 also contains information that indicates the states of the components that form PB 140B omitted from FIG. 7.

The domain 701 is an identifier of each of the FC switches included in the network. As shown in FIG. 4, PA 140A includes the FC switch 401A. The value "0001" shown in FIG. 7 is the identifier of the FC switch 401A.

The port 702 is an identifier of a port of a FC switch included in the network. As shown in FIG. 4, the FC switch 401A included in PA 140A includes PortA1 402A, PortA2 402B, PortA3 402C, and PortA4 402D. Therefore, the identifiers of those four ports are held as the port 702.

The HBA 703 is an identifier of the HBA 104 or the CHA 122 (or CHA 132) that is connected to each port.

The port status 704 is information that indicates a status of each port. The value "ONLINE" indicates that the port is operating normally, and the value "OFFLINE" indicates that a fault has occurred in the port.

The cable status 705 is information that indicates a state of a cable connected to each port. The value "ONLINE" indicates that the cable is normally connected, and the value "OFFLINE" indicates that a fault (for example, a break) has occurred in the connection of the cable.

The HBA vendor name 706 is an identifier of a vendor of the HBA 104 or the CHA 122 (or CHA 132) that is connected to each port.

The switch status table 112 may further contain information for identifying the zone (such as ZoneA 403A shown in FIG. 4) to which each port belongs.

In the example of FIG. 7, all of the ports and all of the cables are in a normal state. This corresponds to the indication that the status 503 corresponding to "network" is set to "ONLINE" in FIG. 5. In a case where even one "OFFLINE" value is held as the port status 704 or the cable status 705, the status 503 corresponding to "network" is set to "OFFLINE" in FIG. 5.

Figure 8:
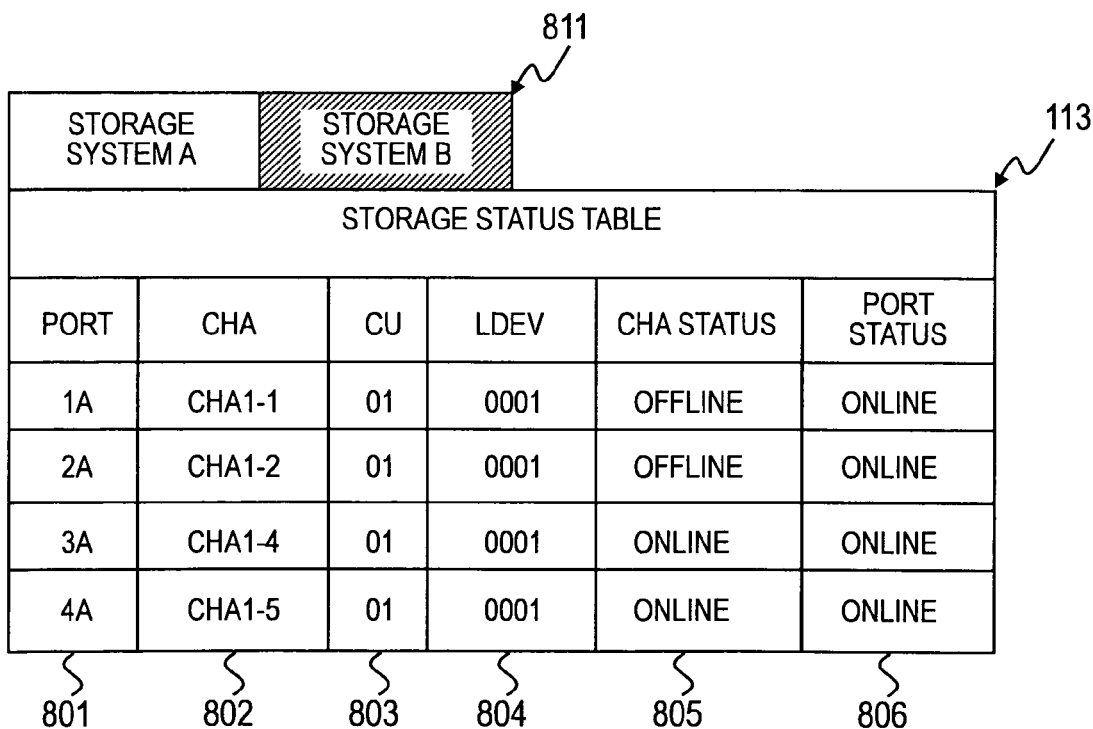
FIG. 8 is an explanatory diagram of a storage status table according to the embodiment of this invention.

FIG. 8 is an explanatory diagram of the storage status table 113 according to the embodiment of this invention.

FIG. 8 shows the contents of the storage status table 113 displayed on the display device 115 according to the instruction from the user.

The displayed storage status table 113 holds information that indicates a state of each of the storage systems for processing the access request from the application host 100. To be specific, the storage status table 113 contains a port 801, a CHA 802, a CU 803, an LDEV 804, a CHA status 805, a port status 806, and a selection tab 811.

The selection tab 811 is a tab that is specified to select the storage system to be displayed. In this embodiment, as shown in FIG. 1, the connection source storage system A 120 and the externally-connected storage system B 130 process the access request from the application host 100. Therefore, in the example of FIG. 8, the selection tab 711 corresponding to each of the connection source storage system A 120 and the externally-connected storage system B 130 is displayed. FIG. 8 shows a case where the connection source storage system A 120 is selected. In this case, as shown in FIG. 8, the display device 115 displays information that indicates the states of the components of the connection source storage system A 120.

It should be noted that in addition to the information indicating the states of the components of the connection source storage system A 120 shown in FIG. 8, the storage status table 113 stored in the memory 103 also contains information that indicates the states of the components of the externally-connected storage system B 130 omitted from FIG. 8.

The port 801 is an identifier of the port of each of the CHAs 122 included in the connection source storage system A 120.

The CHA 802 is an identifier of each of the CHAs 122 included in the connection source storage system A 120.

The CU 803 and the LDEV 804 are information for identifying the logical volume included in the connection source storage system A 120 as shown in FIG. 2.

The CHA status 805 is information that indicates the state of each of the CHAs 122. The value "ONLINE" indicates that the CHA 122 is operating normally, and the value "OFFLINE" indicates that a fault has occurred in the CHA 122.

The port status 806 is information that indicates the state of each of ports of the CHAs 122. The value "ONLINE" indicates that the port is operating normally, and the value "OFFLINE" indicates that a fault has occurred in the port.

In a case where even one "OFFLINE" value is held as the CHA status 805 or the port status 806, the status 503 corresponding to "storage" is set to "OFFLINE" in FIG. 5. In the example of FIG. 8, CHA1-1 122A and CHA1-2 122B are in an "OFFLINE" status, while the other CHAs 122 and the ports are in an "ONLINE" status. This corresponds to the indication that the status 503 corresponding to "storage" is set to "OFFLINE" in FIG. 5 and the indication that the statuses 310 corresponding to the path IDs "0001" and "0002" are both set to "OFFLINE" in FIG. 3.

Figure 9:
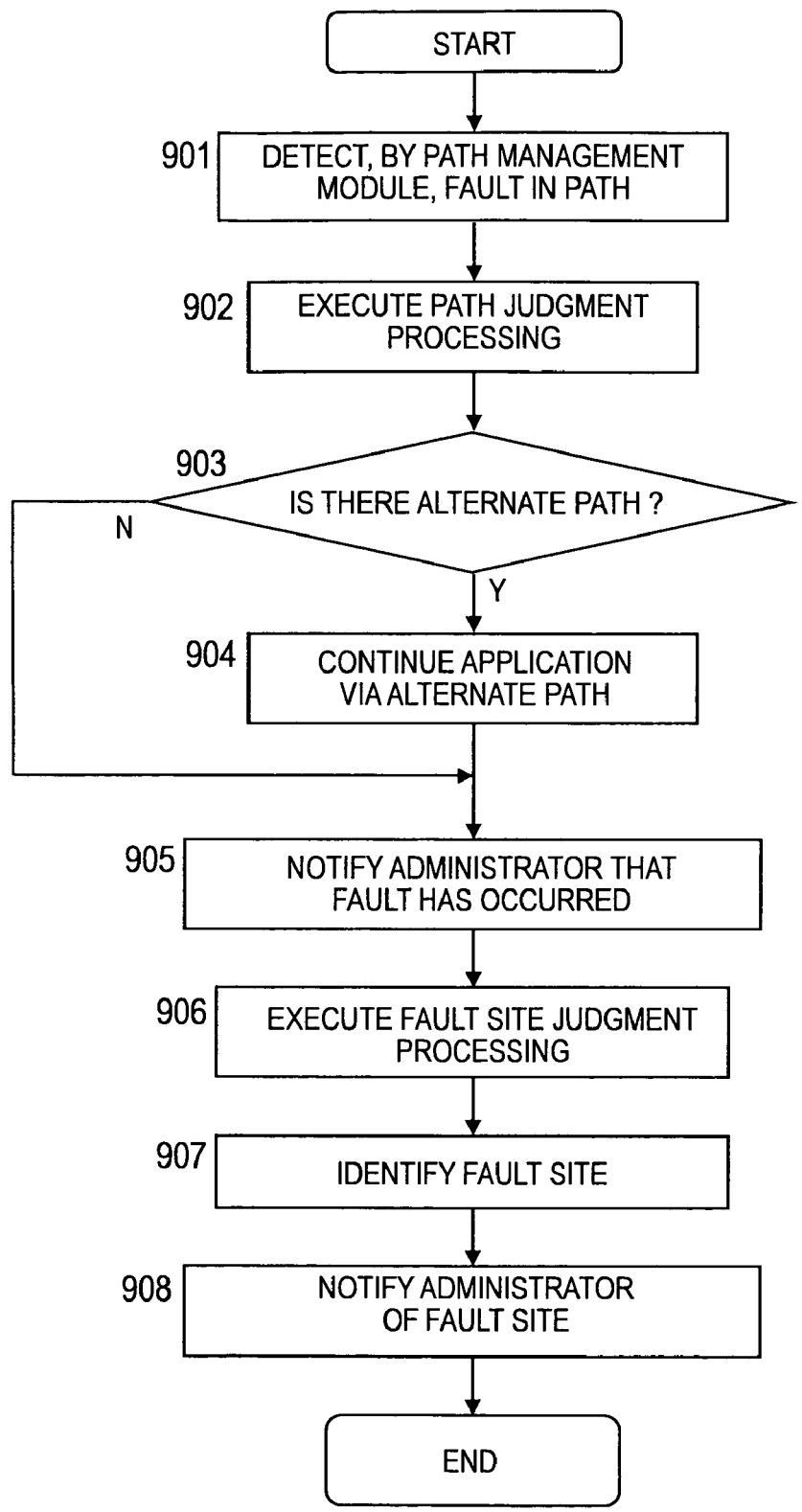
FIG. 9 is a flowchart showing a fault notification processing according to the embodiment of this invention.

FIG. 9 is a flowchart showing a fault notification processing according to the embodiment of this invention.

The fault notification processing is a processing from detecting a fault by the path management module 108 up to notifying the administrator to that effect.

First, the path management module 108 detects a fault that has occurred in a path (Step 901). For example, the path management module 108 judges that a fault has occurred when an error is received as a response to an executed I/O.

Subsequently, the path management module 108 executes a path judgment processing (Step 902). The path judgment processing will be described later in detail by referring to FIG. 10.

Then, as a result of the path judgment processing, the path management module 108 judges whether or not there is an alternate path (in other words, a path that can be used for access made from the application host 100 to R-VOL 133) (Step 903).

If it is judged that there is an alternate path, the path management module 108 uses the alternate path to continue the application (Step 904).

Subsequently, the path management module 108 transmits to the administrator a notification indicating that a fault has occurred (Step 905).

If it is judged in Step 903 that there is no alternate path, the path management module 108 executes Step 905, skipping Step 904.

Then, the path management module 108 executes a fault site judgment processing (Step 906). The fault site judgment processing will be described later in detail by referring to FIG. 11.

Subsequently, based on the result of the fault site judgment processing, the path management module 108 identifies the site where the fault has occurred (Step 907).

Then, the path management module 108 transmits to the administrator a notification indicating the identified fault (Step 908).

After that, the fault notification processing is brought to an end.

Figure 10:
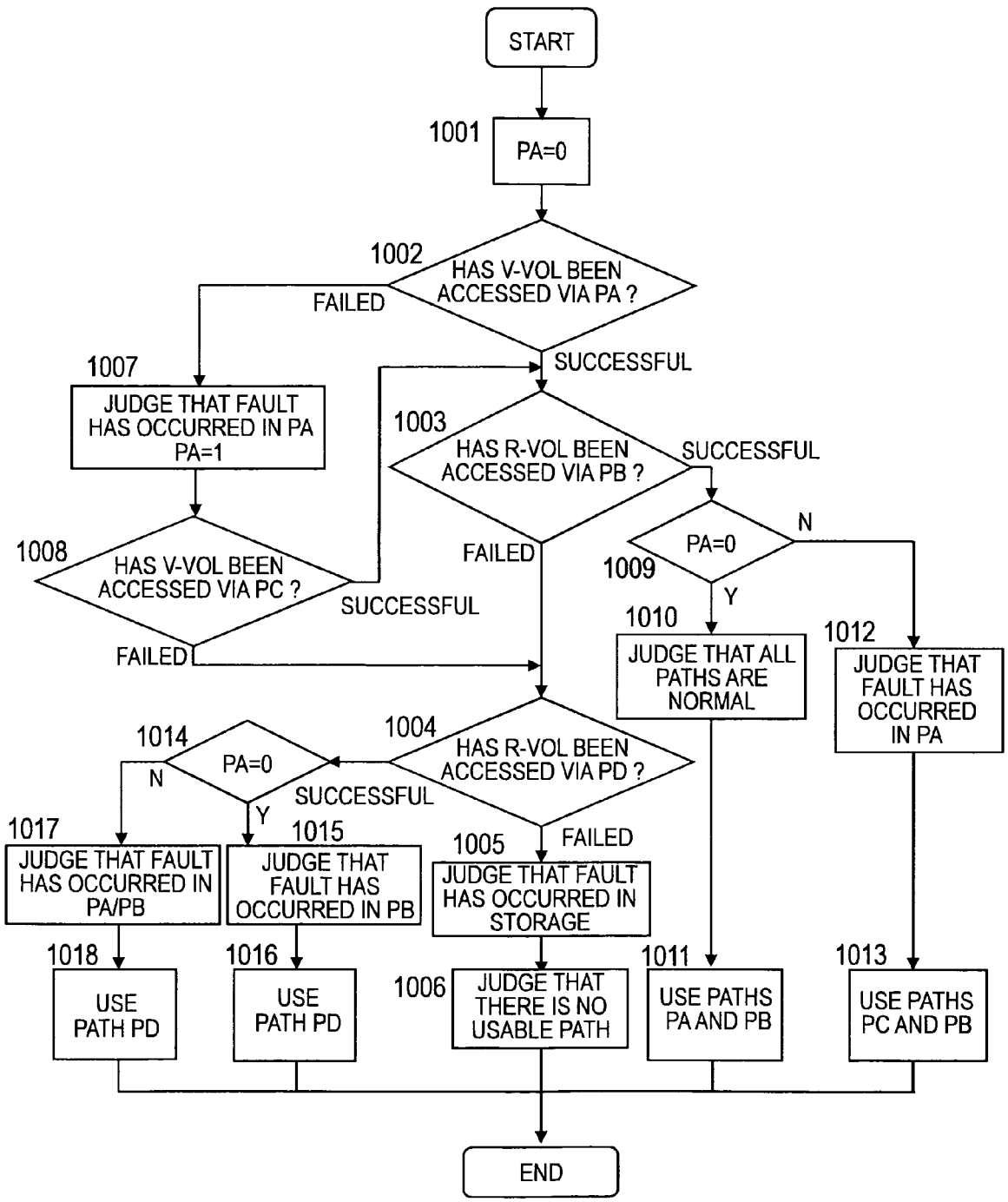
FIG. 10 is a flowchart showing a path judgment processing according to the embodiment of this invention.

FIG. 10 is a flowchart showing the path judgment processing according to the embodiment of this invention.

The path judgment processing shown in FIG. 10 is executed in Step 902 of the fault notification processing shown in FIG. 9.

In a normal state (in other words, when there occurs no fault in the path), the application host 100 can access V-VOL 123 via PA 140A. The connection source storage system A 120 can access R-VOL 133 via PB 140B. In this case, the data write and read by the application host 100 is executed to R-VOL 133 via PA 140A, V-VOL 123, and PB 140B.

In addition, the application host 100 checks the state of each of the CHAs 122 and the ports of the connection source storage system A 120 via PC 151A, and checks the state of each of the CHAs 132 and the ports of the externally-connected storage system B 130 via PD 151B. Upon detection of a fault that has occurred in any site, the path management module 108 executes the path judgment processing to select the path to be used.

First, the path management module 108 sets a flag PA to the value "0" (Step 1001). The flag PA is a flag indicating whether or not a fault has occurred in PA 140A. In the example of FIG. 10, the value "0" of the flag PA indicates that no fault has occurred in PA 140A, and the value "1" indicates that a fault has occurred in PA 140A.

Then, the path management module 108 executes access to V-VOL 123 via PA 140A, and judges whether or not the access has been successful (Step 1002). To be specific, for example, the path management module 108 may transmit a predetermined I/O command to V-VOL 123 via PA 140A. If a response to the command cannot be received within a predetermined time, the path management module 108 may judge that the access to V-VOL 123 via PA 140A has failed. It should be noted that Steps 1003, 1008, and 1004 described later can also be executed in the same manner.

If it is judged in Step 1002 that the access has failed, the path management module 108 judges that a fault has occurred in PA 140A, and changes the value of the flag PA to "1" (Step 1007).

Then, the path management module 108 executes access to V-VOL 123 via PC 151A, and judges whether or not the access has been successful (Step 1008).

If it is judged in Step 1008 that the access has been successful, a fault has occurred in PA 140A, but PC 151A and the connection source storage system A 120 are operating normally. If it is judged in Step 1002 that the access has been successful, both PA 140A and the connection source storage system A 120 are operating normally. In those cases, the path management module 108 executes access to R-VOL 133 via PB 140B, and judges whether or not the access has been successful (Step 1003).

However, if Step 1003 is executed after it is judged in Step 1008 that the access has been successful, the access via PC 151A and PB 140B is executed. On the other hand, if Step 1003 is executed after it is judged in Step 1002 that the access has been successful, the access via PA 140A and PB 140B is executed.

If it is judged in Step 1003 that the access has been successful, at least PB 140B and the externally-connected storage system B 130 are operating normally. In this case, the path management module 108 judges whether or not the flag PA is set to the value "0" (in other words, whether or not PA 140A is in a normal state) (Step 1009).

If it is judged in Step 1009 that the flag PA is set to the value "0", as a result, the path management module 108 judges that all of the paths and the storage systems are in a normal state (Step 1010). In this case, the path management module 108 selects PA 140A and PB 140B as the usable paths (Step 1011), which brings the path judgment processing to an end.

If it is judged in Step 1009 that the flag PA is set to the value "1", it is judged that all of the storage systems and PC 151A and PB 140B are in a normal state, but that a fault has occurred in PA 140A (Step 1012). In this case, the path management module 108 selects PC 151A and PB 140B as the usable paths (Step 1013), which brings the path judgment processing to an end.

If it is judged in Step 1003 that the access has failed, a fault has occurred in at least one of PB 140B and the externally-connected storage system B 130. If it is judged in Step 1008 that the access has failed, the fault has possibly occurred in at least one of PC 151A, the connection source storage system A 120, PB 140B, and the externally-connected storage system B 130. In those cases, the path management module 108 executes the access to R-VOL 133 via the PD 151B, and judges whether or not the access has been successful (Step 1004).

If it is judged in Step 1004 that the access has failed, the path management module 108 judges that a fault has occurred in at least one of the externally-connected storage system B 130 and PD 151B (Step 1005). In this case, the path management module 108 judges that there is no usable path (Step 1006), which brings the path judgment processing to an end.

If it is judged in Step 1004 that the access has been successful, the externally-connected storage system B 130 and PD 151B are operating normally. In this case, the path management module 108 judges whether or not the flag PA is set to the value "0" (Step 1014).

If it is judged that the flag PA is set to the value "0", the path management module 108 judges that a fault has occurred in PB 140B (Step 1015). In this case, the path management module 108 selects PD 151B as the usable path (Step 1016), which brings the path judgment processing to an end.

If it is judged that the flag PA is set to the value "1", the path management module 108 judges that a fault has occurred in PA 140A and PB 140B (Step 1017). In this case, the path management module 108 selects PD 151B as the usable path (Step 1018), which brings the path judgment processing to an end.

Figure 11:
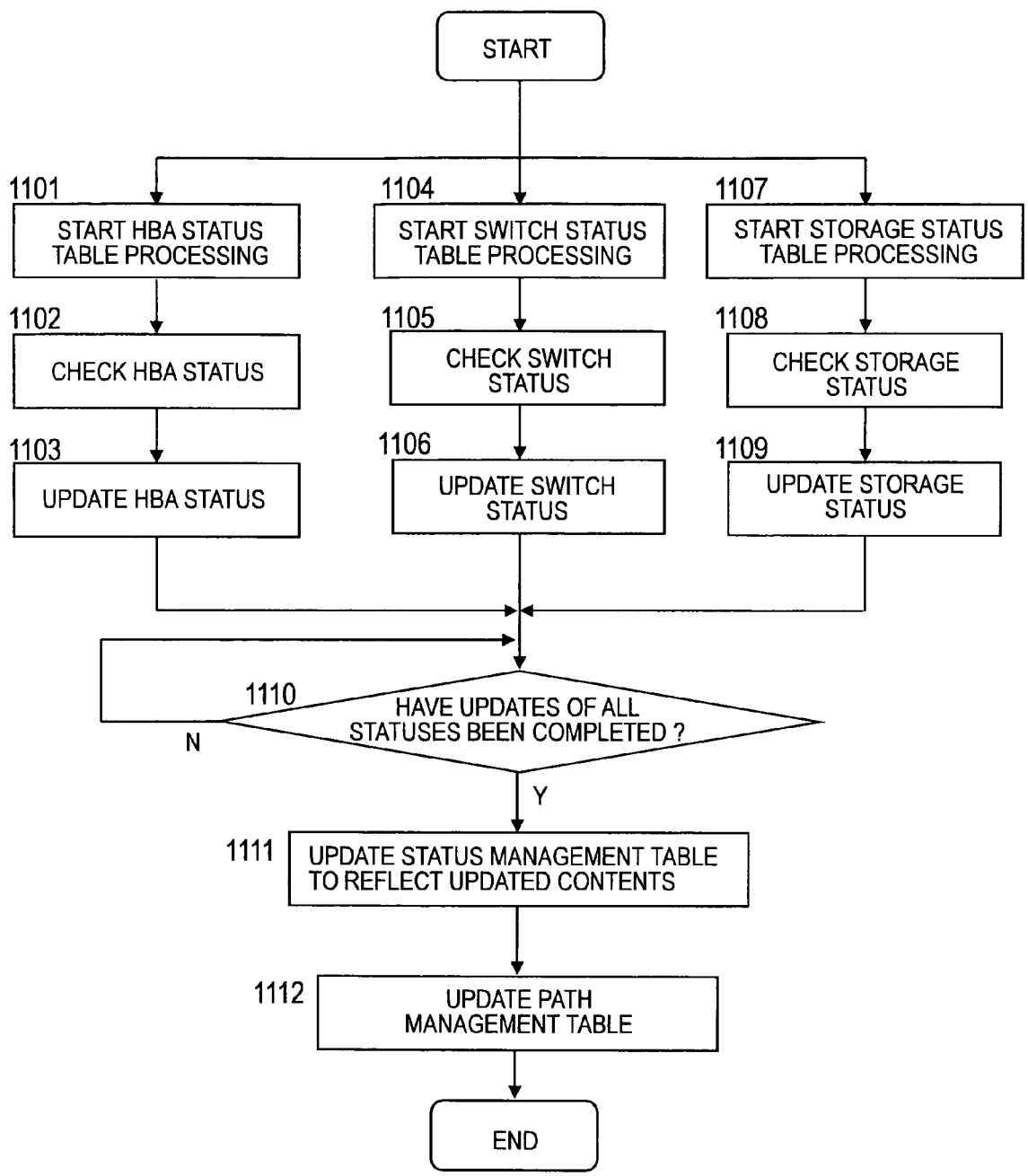
FIG. 11 is a flowchart of a fault site judgment processing according to the embodiment of this invention.

FIG. 11 is a flowchart of the fault site judgment processing according to the embodiment of this invention.

The fault site judgment processing shown in FIG. 11 is executed in Step 906 of the fault notification processing shown in FIG. 9.

First, the path management module 108 starts an HBA status table processing (Step 1101). The HBA status table processing is a processing (to be specific, the subsequent processing of Steps 1102 and 1103) of updating the HBA status table 111.

Then, the path management module 108 checks the status of each of the HBAs 104 (Step 1102). To be specific, for example, the path management module 108 may transmit a predetermined command to each of the HBAs 104, and if a response to the command is not received within a predetermined time, the path management module 108 may judge that the HBA 104 is in an "OFFLINE" status. Alternatively, in response to the command, if a response indicating that a fault has occurred in the HBA 104 is received, the path management module 108 may judge that the HBA 104 is in an "OFFLINE" status.

Subsequently, the path management module 108 updates the HBA status table 111 so as to reflect the status checked in Step 1102 (Step 1103).

In addition, the path management module 108 starts a switch status table processing (Step 1104). The switch status table processing is a processing (to be specific, the subsequent processing of Steps 1105 and 1106) of updating the switch status table 112.

Then, the path management module 108 checks the status of each of the FC switches (in the example of FIG. 4, FC switch 401A and 401B) (Step 1105). For example, the path management module 108 may transmit a predetermined command to each of the FC switches via the third network 150, and perform judgment based on a response to the command in a similar manner to Step 1102.

Subsequently, the path management module 108 updates the switch status table 112 so as to reflect the status checked in Step 1105 (Step 1106).

In addition, the path management module 108 starts a storage status table processing (Step 1107). The storage status table processing is a processing (to be specific, the subsequent processing of Steps 1108 and 1109) of updating the storage status table 113.

Then, the path management module 108 checks the status of each of the storage systems (in the example of FIG. 1, the connection source storage system A 120 and the externally-connected storage system B 130) (Step 1108). For example, the path management module 108 may transmit a predetermined command to each of the storage systems via the third network 150, and perform judgment based on a response to the command in a similar manner to Step 1102.

Subsequently, the path management module 108 updates the storage status table 113 so as to reflect the status checked in Step 1108 (Step 1109).

FIG. 11 shows an example of parallel execution of the above-mentioned HBA status table processing, switch status table processing, and storage status table processing. However, those processings may be executed sequentially. For example, first Steps 1101 to 1103, then Steps 1104 to 1106, and then Steps 1107 to 1109 may be executed.

Then, the path management module 108 judges whether or not the updates of all of the status tables have been completed (Step 1110).

If it is judged in Step 1110 that the updates have not been completed, the path management module 108 waits until the updates are completed.

If it is judged in Step 1110 that the updates have been completed, the path management module 108 updates the status management table 110 so as to reflect the updated contents (Step 1111).

Then, the path management module 108 updates the path management table 109 based on the updated status management table 110 (Step 1112).

After that, the fault site judgment processing is brought to an end.

In the processing shown in FIG. 10, the table shown in FIG. 12 may be referenced. To be specific, in the processing shown in FIG. 10, after the path in which a fault has occurred is identified (in other words, after Steps 1010, 1012, 1017, and 1015), the table shown in FIG. 12 may be referenced for selection of the path to be used.

FIG. 12 is an explanatory diagram of the access route judgment table 114 according to the embodiment of this invention.

In each of rows (rows 1211 to 1226), the access route judgment table 114 holds information in which a path used for data access in the computer system according to the embodiment of this invention is associated with another path (in other words, an alternate path) used in a case where a fault has occurred in the path. To be specific, the access route judgment table 114 contains a fault site 1201 and an access route 1202.

The fault site 1201 is information for identifying the path in which a fault has occurred. For example, the values "PA" and "PA1" held as the fault site 1201 are information for identifying PA 140A as shown in a row 1214 and PA1 141A as shown in a row 1212, respectively.

The access route 1202 is information for identifying the alternate path used in a case where a fault has occurred in the path identified by the fault site 1201. For example, "PA to V-VOL to PB to R-VOL" as shown in a row 1211 is information for identifying a path that extends from the application host 100 via PA 140A, V-VOL 123, and PB 140B to reach R-VOL 133. It should be noted that the access route 1202 corresponding to the blank fault site 1201 is information for identifying a path used in a case where a fault has not occurred in any path.

The following description will be made with some of the rows 1211 to 1226 taken as examples.

The fault site 1201 of the row 1211 is blank, and the access route 1202 of the row 1211 is "PA to V-VOL to PB to R-VOL". This indicates that if a fault has not occurred in any path, the path that extends from the application host 100 via PA 140A, V-VOL 123, and PB 140B to reach R-VOL 133 is used. This corresponds to Step 1011 of FIG. 10.

The fault site 1201 and the access route 1202 of the row 1212 are "PA1" and "PA2 to V-VOL to PB to R-VOL", respectively. This indicates that if a fault has occurred in PA1 141A, the path that extends from the application host 100 via PA2 141B, V-VOL 123, and PB 140B to reach R-VOL 133 is used as the alternate path. This corresponds to Step 1011 of FIG. 10 since at least a portion of PA 140A can be used.

The fault site 1201 and the access route 1202 of the row 1214 are "PA" and "PC to V-VOL to PB to R-VOL", respectively. This indicates that if a fault has occurred in PA 140A (in other words, both PA1 141A and PA2 141B), the path that extends from the application host 100 via PC 151A, V-VOL 123, and PB 140B to reach R-VOL 133 is used as the alternate path. This corresponds to Step 1013 of FIG. 10.

The fault site 1201 and the access route 1202 of the row 1217 are "PB" and "PD to R-VOL", respectively. This indicates that if a fault has occurred in PB 140B (in other words, both PB1 141C and PB2 141D), the path that extends from the application host 100 via PD 151B to reach R-VOL 133 is used as the alternate path. This corresponds to Step 1016 of FIG. 10.

The fault site 1201 and the access route 1202 of the row 1226 are "PB/PB" and "PD to R-VOL", respectively. This indicates that if a fault has occurred in PA 140A (in other words, both PA1 141A and PA2 141B) and PB 140B (in other words, both PB1 141C and PB2 141D), the path that extends from the application host 100 via PD 151B to reach R-VOL 133 is used as the alternate path. This corresponds to Step 1018 of FIG. 10.

As a result, according to the path judgment processing as shown in FIG. 10 and the access route judgment table 114 as shown in FIG. 12, the usable paths are associated with paths to be preferentially used in a case where those paths can be used. To be specific, in a case where both the path in the FC network and the path in the IP network can be used, the path in the FC network is preferentially used as a rule.

In the example of FIG. 10, as long as at least one of a plurality of paths (in the example of FIG. 1, PA1 141A and PA2 141B) included in PA 140A can be used, the alternate path is not used. The same applies to PB 140B. However, if the number of the usable paths among the plurality of paths becomes equal to or less than a predetermined value, the alternate path may be used concurrently with the path that is still usable.

For example, the number of the usable paths among a plurality of paths (in the example of FIG. 1, PB1 141C and PB2 141D) included in PB 140B becomes equal to or less than 1 (in other words, becomes less than 2), PD 151B may be used as the alternate path. If one of PB1 141C and PB2 141D is still usable, the path that extends from the application host 100 to reach R-VOL 133 and that includes the usable path and the path that includes PD 151B are both used.

For example, the fault site 1201 and the access route 1202 of the row 1215 are "PB1" and "PA to V-VOL to PB2/PD to R-VOL", respectively. This indicates that if a fault has occurred in PB1 141C, the path that extends from the application host 100 via PA 140A, V-VOL 123, and PB2 141D to reach R-VOL 133 and the path that extends from the application host 100 via PD 151B to reach R-VOL 133 are used as the alternate path.

If a fault occurs in a portion of a plurality of paths, performance may be lowered due to access load concentrated in the remaining usable paths. However, by using the usable path in the FC network concurrently with the alternate path in the IP network as described above to balance the access load across those paths, it is possible to suppress the reduction in performance caused due to the fault.

Figure 13:
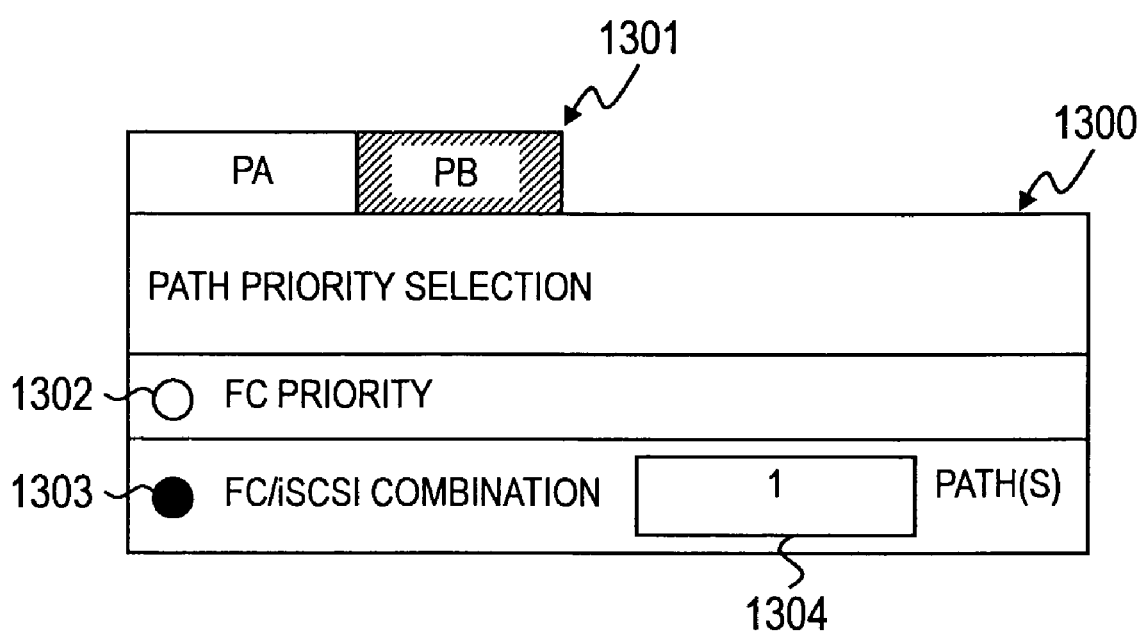
FIG. 13 is an explanatory diagram of a path priority setting screen displayed on a display device according to the embodiment of this invention.

The user can use, for example, a screen shown in FIG. 13 to select whether or not the above-mentioned concurrent use of the path in the FC network and the path in the IP network is permitted.

To be specific, in the case where the path that extends from the application host 100 via PA 140A, V-VOL 123, and PB2 141D to reach R-VOL 133 and the path that extends from the application host 100 via PD 151B to reach R-VOL 133 are used as described above, the application host 100 converts a part of a plurality of the access requests for V-VOL 123 into the access request for R-VOL 133. Then, the application host 100 transmits the access request for V-VOL 123 to V-VOL 123 via PA 140A, and further transmits the converted access request to R-VOL 133 via PD 151B.

FIG. 13 is an explanatory diagram of a path priority setting screen 1300 displayed on the display device 115 according to the embodiment of this invention.

The path priority setting screen 1300 is displayed for receiving an input as to whether or not the concurrent use of the path in the FC network and the path in the IP network is permitted. To be specific, the path priority setting screen 1300 contains a selection tab 1301, an FC priority button 1302, an FC/iSCSI combination button 1303, and a number-of-path input field 1304.

The selection tab 1301 is a tab that is specified to select a screen to be displayed. In this embodiment, for each of PA 140A and PB 140B, it is possible to specify whether or not the concurrent use of the path in the FC network and the path in the IP network is permitted. For example, if the user selects "PA" for the selection tab 1301, a screen for specifying whether or not the concurrent use of the usable path of PA 140A and the path (for example, PC 151A) in the IP network is permitted is displayed. FIG. 13 shows the case where "PA" is selected.

The FC priority button 1302 and the FC/iSCSI combination button 1303 are so-called radio buttons one of which is to be selected.

If the FC priority button 1302 is operated (for example, clicked on by a mouse), the concurrent use of the path in the FC network and the path in the IP network is prohibited. In other words, in this case, for example, as long as at least one usable path is included in PA 140A, PA 140A cannot be used concurrently with the path (for example, PC 151A) in the IP network.

On the other hand, if the FC/iSCSI combination button 1303 is operated, the concurrent use of the path in the FC network and the path in the IP network is permitted. In addition, the user can input an arbitrary number as the number of paths into the number-of-path input field 1304. If the number of paths in the FC network becomes equal to or less than inputted in the number-of-path input field 1304, the path in the FC network is concurrently used with the path in the IP network.

For example, in the example of FIG. 13, the FC/iSCSI combination button 1303 has been operated, and in addition, the value "1" has been inputted in the number-of-path input field 1304. In this example, if the number of the usable paths included in PA 140A becomes equal to or less than "1", PA 140A is concurrently used with the alternate path (for example, PC 151A) in the IP network.

FIG. 12 shows an example where in the screen of FIG. 13, the FC priority button 1302 has been operated for PA 140A, while the FC/iSCSI combination button 1303 has been operated for PB 140B, and the value "1" has been inputted in the number-of-path input field 1304.

It should be noted that the controller 121 of the connection source storage system A 120 includes the cache memory 124, and if a fault occurs in PB 140B before the data stored in the cache memory 124 is stored in R-VOL 133, the application host 100 may become unable to use the data stored in the cache memory 124 (in other words, the most recent data).

In a normal case where the cache memory 124 is used, after completion of storage of the data whose write has been requested into the cache memory 124, even if the data has not been stored yet in V-VOL 123 (in other words, R-VOL 133 corresponding thereto), the connection source storage system A 120 transmits to the application host 100 a completion report of the write processing. After that, if a fault occurs in PB 140B before the data is stored in R-VOL 133, the application host 100 cannot reflect the most recent data stored in the cache memory 124 upon R-VOL 133 because the application host 100 cannot be notified that the data has not yet been stored in R-VOL 133. Since the alternate path that extends from the application host 100 to reach R-VOL 133 bypasses the connection source storage system A 120, the application host 100 cannot access the cache memory 124. Therefore, the application host 100 cannot use the most recent data stored in the cache memory 124.

In this embodiment, in order to prevent the occurrence of the problem as described above, the concurrent use of the FC network and the IP network is always permitted for PB 140B. To be specific, for example, if "PB" is selected for the selection tab 1301 in the screen of FIG. 13, the FC/iSCSI combination button 1303 may be operated automatically to block the operation of the FC priority button 1302.

Figure 14:
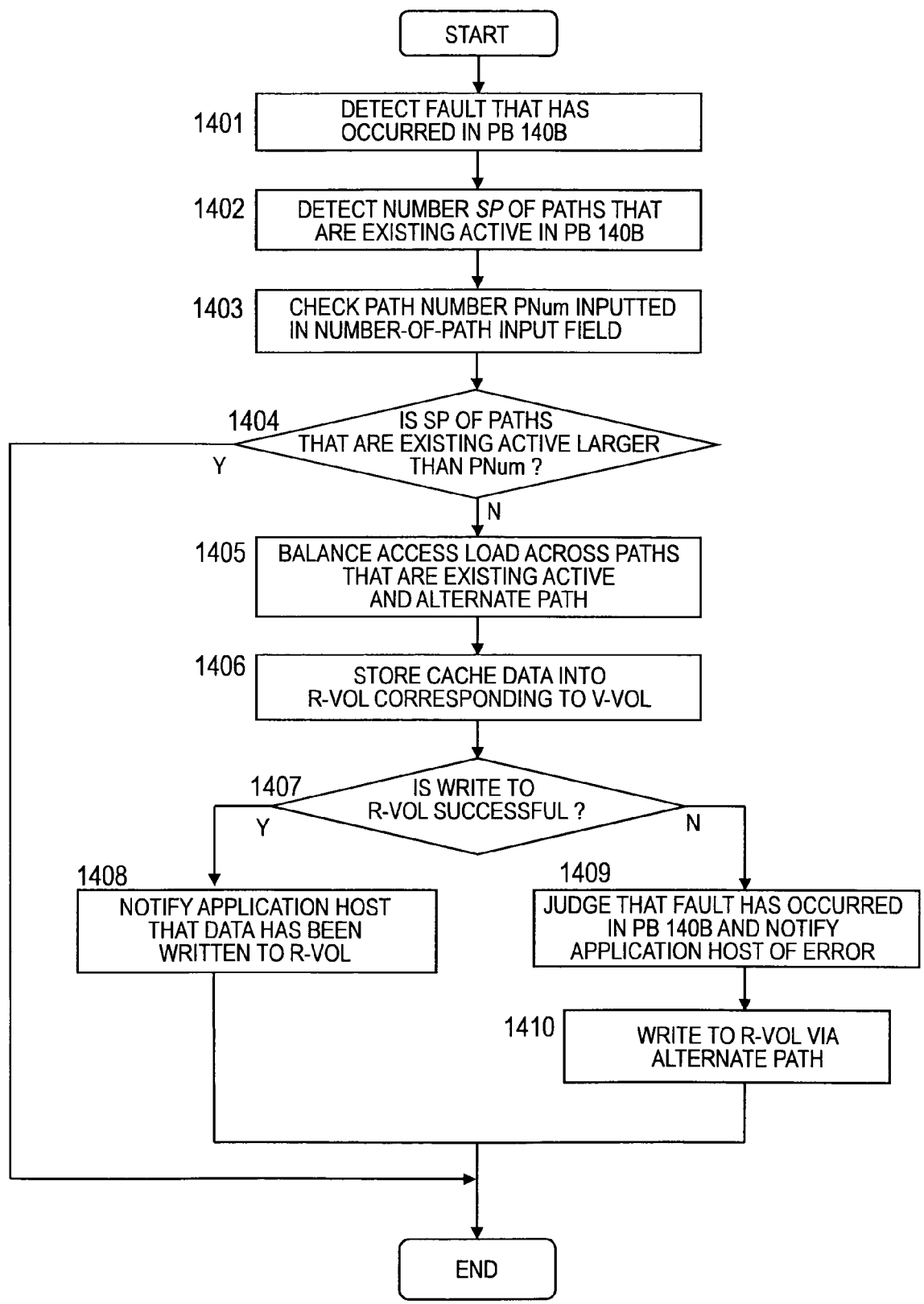
FIG. 14 is a flowchart showing a processing executed for checking consistency of data according to the embodiment of this invention.

FIG. 14 is a flowchart showing a processing executed for checking consistency of data according to the embodiment of this invention.

For example, if a fault occurs in at least one of a plurality of paths included in PB 140B (Step 1401), the application host 100 detects a number SP of paths that are existing active in PB 140B (in other words, usable paths in which no fault has occurred) (Step 1402).

Then, the application host 100 checks a path number PNum that has been inputted in the number-of-path input field 1304 of the FC/iSCSI combination button 1303 (Step 1403). The following description will be made with a case where the path number PNum is "1" taken as an example.

Subsequently, the application host 100 compares the number SP of the paths that are existing active with the path number PNum inputted in the number-of-path input field 1304 (Step 1404).

If the number SP of the paths that are existing active is larger than the path number PNum, the flow of FIG. 14 is brought to an end without executing the load balance across the alternate path. In this case, the application is continued by using the paths that are existing active.

On the other hand, if the number SP of the paths that are existing active is equal to or less than the path number PNum, the application host 100 uses the alternate path (for example, PD 151B) of the third network 150 to balance the access load between the usable path of PB 140B and the alternate path (Step 1405).

Further, the application host 100 instructs the connection source storage system A 120 to store in V-VOL 123 at least the data that has not yet been stored in V-VOL 123 (in other words, R-VOL 133 corresponding thereto) among the data stored in the cache memory 124. According to the instruction, the connection source storage system A 120 stores the data stored in the cache memory 124 into R-VOL 133 corresponding to V-VOL 123 (Step 1406).

The connection source storage system A 120 judges whether or not the write with respect to R-VOL 133 is successful in Step 1406 (Step 1407). If the write with respect to R-VOL 133 is successful, the connection source storage system A 120 transmits a completion notification to the application host 100 (Step 1408). On the other hand, if the write fails, the connection source storage system A 120 judges that a fault has occurred in every path included in PB 140B, and notifies the application host 100 of an error (Step 1409). Upon notification of the error, the application host 100 executes the write with respect to R-VOL 133 via the alternate path (Step 1410). Therefore, the most recent data can be reflected upon R-VOL 133, and even after that, the application can be continued by using the alternate path.

Unlike the above-mentioned case, if the connection source storage system A 120 does not transmit the completion report until the storage into R-VOL 133 is completed, the access performance is lowered. However, by balancing the load across the alternate path (for example, PD 151B), it is possible to suppress the reduction in access performance.

As described above, according to the embodiment of this invention, even if a fault occurs in the paths in the FC networks which extends from the application host 100 to R-VOL 133 in which the data is actually stored, it is possible to continue the application by using an auxiliary path (for example, the path in the IP network). As a result, the application is prevented from stopping. Further, by concurrently using the path in the FC network and the auxiliary path and balancing the access load across those paths, it is possible to suppress the reduction in performance in a case where a fault occurs in a portion of the path in the FC network. In addition, according to the embodiment of this invention, it is possible to identify the site where the fault has occurred.

While the present invention has been described in detail and pictorially in the accompanying drawings, the present invention is not limited to such detail but covers various obvious modifications and equivalent arrangements, which fall within the purview of the appended claims.

What is claimed is:

1. A method of controlling a computer system,
the computer system including:
   a computer;
   a first storage system; and
   a second storage system,
the first storage system being connected to the computer via a first path and a second path,
the second storage system being connected to the first storage system via a third path and connected to the computer via a fourth path,
the computer including:
   a first interface connected to the first path;
   a second interface connected to the second path;
   a third interface connected to the fourth path;
   a first processor connected to the first interface, the second interface, and the third interface; and
   a first memory connected to the first processor,
the first storage system including a first controller connected to the first path, the second path, and the third path,
the first storage system providing a first storage area to the computer,
the second storage system including a second controller connected to the third path and the fourth path, and a second storage area,
the first storage system being configured to convert, upon reception of an access request for access to the first storage area from the computer, the received access request into an access request for access to the second storage area, and transmit the converted access request to the second storage system via the third path,
the second storage system being configured to execute, upon reception of the access request for the access to the second storage area from one of the computer and the first storage system, an access processing for the access to the second storage area based on the received access request,
the computer holding:
   a first information item in which the first storage area is associated with the second storage area; and
   a second information item in which a judgment result as to whether or not a fault has occurred in at least one of the first path, the second path, the third path, and the fourth path is associated with at least one of the first path, the second path, the third path, and the fourth path used for one of the access to the first storage area and the access to the second storage area,
the method comprising:
a first step of judging, by the computer, whether or not a fault has occurred in at least one of the first path, the second path, the third path, and the fourth path;
a second step of selecting, by the computer, based on the judgment result and the second information item, at least one of the first path, the second path, the third path, and the fourth path used for one of the access to the first storage area and the access to the second storage area; and
a third step of transmitting, by the computer, the access request for one of the access to the first storage area and the access to the second storage area by using the selected at least one of the first path, the second path, the third path, and the fourth path.

2. The method according to claim 1, wherein:
the second step includes selecting the first path if it is judged in the first step that a fault has not occurred in any one of the first path, the second path, the third path, and the fourth path;
the third step includes transmitting the access request for the access to the first storage area to the first storage system via the selected first path;
the second step further includes selecting the second path if it is judged in the first step that a fault has occurred in the first path and if a fault has not occurred in the second path; and
the third step further includes transmitting the access request for the access to the first storage area to the first storage system via the selected second path.

3. The method according to claim 2, wherein:
the second step further includes selecting the fourth path if it is judged in the first step that a fault has occurred in the third path; and
the third step further includes transmitting the access request for the access to the second storage area to the second storage system via the selected fourth path.

4. The method according to claim 1, wherein the first step further includes:
judging that a fault has occurred in the first path if the access to the first storage area via the first path has failed; and
judging that a fault has occurred in the third path if the access to the second storage area via the third path has failed.

5. The method according to claim 1, wherein the second path and the fourth path are set in a network lower in data transfer speed than a network in which the first path and the third path are set.

6. The method according to claim 5, wherein:
the first path and the third path are set in a network to which a Fibre channel protocol is applied; and
the second path and the fourth path are set in network to which an internet protocol is applied.

7. The method according to claim 1, wherein:
the second storage system is further connected to the first storage system via at least one fifth path;
the first storage system distributedly transmits a plurality of the converted access requests through the third path and the at least one fifth path;
the third path and the at least one fifth path pass through a switch device; and
the method further comprises:
a fourth step of judging, by the computer, if it is judged that a fault has occurred in at least one of the first path, the second path, the third path, the fourth path, and the fifth path, whether or not a fault has occurred in each of the third path and the at least one fifth path by transmitting a predetermined command to the switch device; and
the third step includes converting, if it is judged that the number of the at least one fifth path in which no fault has occurred is less than a predetermined threshold, a part of the plurality of access requests for the access to the first storage area into the access requests for the access to the second storage area, and transmitting the converted access requests to the second storage system via the fourth path.

8. The method according to claim 7, wherein:
the first storage system further includes a cache memory in which at least one of data to be written to the first storage area and data read from the first storage area is temporarily stored;
the method further comprises:
a fifth step of causing the computer to transmit, if it is judged that the number of the at least one fifth path in which no fault has occurred is less than the predetermined threshold, a cache data write request for writing the data stored in the cache memory to the first storage area, to the first storage system;
a sixth step of causing the first storage system to transmit, upon reception of the cache data write request, a request for storing at least data that has not been stored in the second storage area among the data stored in the cache memory into the second storage area, to the second storage system; and
a seventh step of causing the first storage system to transmit, upon reception of the access request for the access to the first storage area after the reception of the cache data write request, a completion report in response to the received access request to the computer only when a completion report in response to the converted access request is received from the second storage system.

9. A computer system comprising:
a computer;
a first storage system; and
a second storage system, wherein:
the first storage system is connected to the computer via a first path and a second path;
the second storage system is connected to the first storage system via a third path and connected to the computer via a fourth path;
the computer includes:
a first interface connected to the first path;
a second interface connected to the second path;
a third interface connected to the fourth path;
a first processor connected to the first interface, the second interface, and the third interface; and
a first memory connected to the first processor;
the first storage system includes a first controller connected to the first path, the second path, and the third path;
the first storage system provides a first storage area to the computer;
the second storage system includes a second controller connected to the third path and the fourth path, and a second storage area;
the first storage system is configured to convert, upon reception of an access request for access to the first storage area from the computer, the received access request into an access request for access to the second storage area, and transmit the converted access request to the second storage system via the third path;
the second storage system is configured to execute, upon reception of the access request for the access to the second storage area from one of the computer and the first storage system, an access processing for the access to the second storage area based on the received access request; and
the computer is configured to:
hold a first information item in which the first storage area is associated with the second storage area;
hold a second information item in which a judgment result as to whether or not a fault has occurred in at least one of the first path, the second path, the third path, and the fourth path is associated with at least one of the first path, the second path, the third path, and the fourth path used for one of the access to the first storage area and the access to the second storage area;

judge whether or not a fault has occurred in at least one of the first path, the second path, the third path, and the fourth path;

select based on the judgment result and the second information item, at least one of the first path, the second path, the third path, and the fourth path used for one of the access to the first storage area and the access to the second storage area; and transmit the access request for one of the access to the first storage area and the access to the second storage area by using the selected at least one of the first path, the second path, the third path, and the fourth path.

10. The computer system according to claim 9, wherein the computer is configured to:

select the first path if it is judged that a fault has not occurred in any one of the first path, the second path, the third path, and the fourth path;

transmit the access request for the access to the first storage area to the first storage system via the selected first path;

select the second path if it is judged that a fault has occurred in the first path and if a fault has not occurred in the second path; and transmit the access request for the access to the first storage area to the first storage system via the selected second path.

11. The computer system according to claim 10, wherein the computer is configured to:

select the fourth path if it is judged that a fault has occurred in the third path; and transmit the access request for the access to the second storage area to the second storage system via the selected fourth path.

12. The computer system according to claim 9, wherein the computer is configured to:

judge that a fault has occurred in the first path if the access to the first storage area via the first path has failed; and judge that a fault has occurred in the third path if the access to the second storage area via the third path has failed.

13. The computer system according to claim 9, wherein the second path and the fourth path are set in a network lower in data transfer speed than a network in which the first path and the third path are set.

14. The computer system according to claim 13, wherein:

the first path and the third path are set in a network to which a Fibre channel protocol is applied; and the second path and the fourth path are set in network to which an internet protocol is applied.

15. The computer system according to claim 9, wherein:

the second storage system is further connected to the first storage system via at least one fifth path;

the first storage system distributedly transmits a plurality of the converted access requests through the third path and the at least one fifth path;

the third path and the at least one fifth path pass through a switch device; and the computer is configured to:

judge, if it is judged that a fault has occurred in at least one of the first path, the second path, the third path, the fourth path, and the fifth path, whether or not a fault has occurred in each of the third path and the at least one fifth path by transmitting a predetermined command to the switch device; and convert, if it is judged that the number of the at least one fifth path in which no fault has occurred is less than a predetermined threshold, a part of the plurality of access requests for the access to the first storage area into the access requests for the access to the second storage area, and transmit the converted access requests to the second storage system via the fourth path.

16. The computer system according to claim 15, wherein:

the first storage system further includes a cache memory in which at least one of data to be written to the first storage area and data read from the first storage area is temporarily stored;

the computer is configured to transmit, if it is judged that the number of the at least one fifth path in which no fault has occurred is less than the predetermined threshold, a cache data write request for writing the data stored in the cache memory to the first storage area, to the first storage system; and the first storage system is configured to:

transmit, upon reception of the cache data write request, a request for storing at least data that has not been stored in the second storage area among the data stored in the cache memory into the second storage area, to the second storage system; and inhibit, upon reception of the access request for the access to the first storage area after the reception of the cache data write request, a completion report in response to the received access request from being transmitted to the computer until a completion report in response to the converted access request is received from the second storage system.

* * * * *